April 14, 1942.   G. E. BARNHART   2,279,611
METHOD OF MAKING A HYGROMETER
Filed Oct. 31, 1939
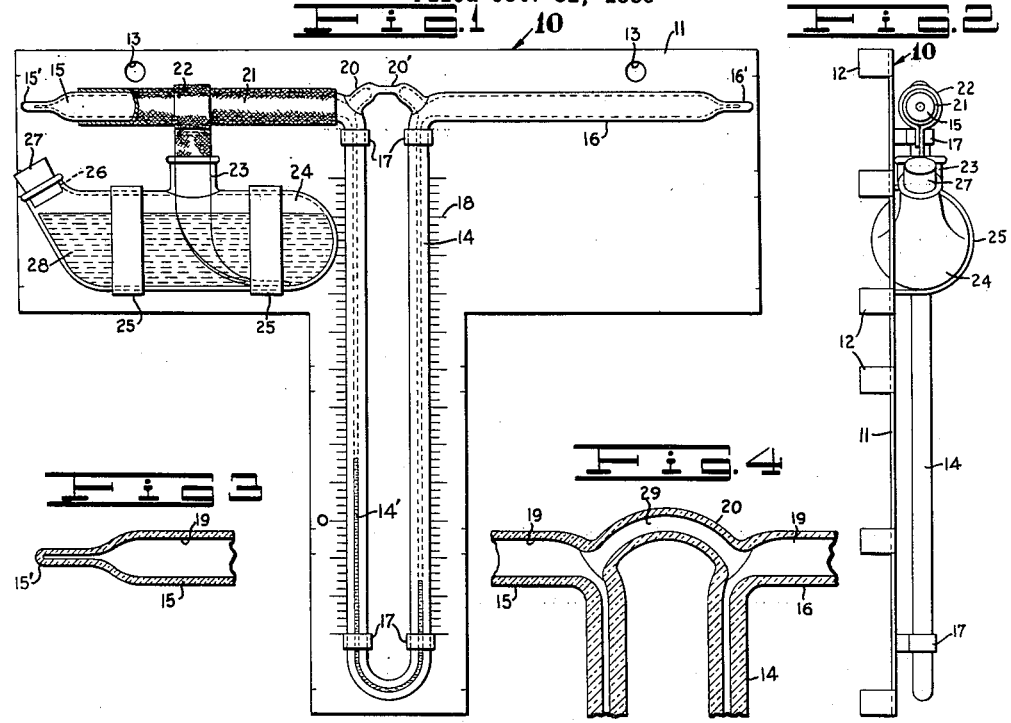
INVENTOR.
George E. Barnhart.
BY
ATTORNEY.

Patented Apr. 14, 1942

2,279,611

UNITED STATES PATENT OFFICE 2,279,611

METHOD OF MAKING HYGROMETERS

George E. Barnhart, Pasadena, Calif.

Application October 31, 1939, Serial No. 302,147

2 Claims. (Cl. 73—338)

This invention relates to scientific measuring instruments.

The general object of the invention is to provide a novel method of making an instrument for determining atmospheric or other conditions.

A more specific object of the invention is to provide a novel method of making a hygrometer.

A further object of the invention is to provide a novel method of making a thermometer.

Other objects and the advantages of this invention will be apparent from the following description taken in connection with the accompanying drawing, wherein:

Fig. 1 is a front elevation of a hygrometer embodying the features of my invention;

Fig. 2 is a side elevation therof;

Fig. 3 is an enlarged fragmentary section of an end of one of the bulbs; and

Fig. 4 is an enlarged fragmentary section of the upper center portion of the instrument before closing the channel.

Referring to the drawing by reference characters I have shown my invention as embodied in an instrument which is indicated generally at 10. As shown the instrument is mounted on a base 11. The base may be supported on a plurality of legs 12 or may be hung on nails which pass through apertures 13.

As shown the instrument consists of a U-shaped capillary tube 14 with opposed, outwardly directed, enlarged hollow bulbs 15 and 16 which communicate with the tube 14 at the upper ends thereof. The capillary tube 14 is secured to the base 11 by brackets 17 in proper relation to indicia 18 on the base.

The opposed bulbs 15 and 16 are provided with enlarged elongated chambers 19 closed at the outer ends thereof and connected to the capillary tube at the inner ends. The upper end of the U-tube is reinforced by a connecting tube 20.

The bulb 15 is encircled by a fabric tube 21 which is itself surrounded by a fabric wick 22. The wick 22 extends downwardly through an aperture 23 in a receptacle 24 supported in an opening in the base 11 by means of supports 25. The receptacle 24 includes a filling opening 26 provided with a closure member 27. The receptacle is preferably partially filled with a liquid 28 such as water into which the wick 22 projects.

In manufacturing the device 10 the bulbs 15 and 16 are left open at the free ends. The connecting link 20 includes a chamber 29 (see Fig. 4) which affords communication between the chambers 19 in the arms 15 and 16. A suitable quantity of liquid such as light Russian mineral oil or similar oil or other suitable fluid is then introduced through the bulb 16 and settles in the lower portion of the capillary tube 14. A suitable gas such as nitrogen is then forced through the bulbs 15 and 16. The oil may be dyed if so desired to facilitate reading.

The gas passing through the bulbs and the link 20 has an aspirator effect on the air in the legs of the capillary tube and drains some of the air from the capillary tubes but does not disturb the oil therein. One of the bulbs e. g. 15 is then closed as at 15' after which the other bulb 16 is closed as at 16'. The gas pressure is then allowed to balance the liquid in the two sides of the capillary tubes. After the liquid is balanced the connecting link 20 is closed as at 20' in Fig. 1.

The balance and/or sealing of the connecting link preferably is done at room temperature and in sealing an asbestos or other shield may protect the link 20 to prevent unbalancing due to the sealing operation. Should further balancing of the gas pressure in the two chambers be required this can be done by further closing the end of either the bulb 15 or the bulb 16. The bulbs 15 and 16 preferably have the same volume as well as pressure. The pressure in the bulbs 15 and 16 may vary from a low pressure to a pressure as high as the bulbs and U-tube will stand. The instrument is preferably made of glass or other transparent material but may be made of plastics.

In use the instrument is placed in a suitable location where the relative humidity is to be determined. The wick member is placed on the bulb 15 and is thoroughly moistened. After a period of time evaporation of moisture causes a cooling of the wick member and the arm bulb thus reducing the gas pressure in this bulb and allowing the gas in the end 16 to force the oil column 28 so that the column on the moistened side rises. The reading is then noted and as the scale has been previously calibrated from a zero mark the relative humidity can be determined.

The bulbs 15 and 16 are shown as horizontally disposed and this arrangement is preferable although the bulbs may, if desired, have their axes directed upwardly from the axes of the capillary tube. Such upward or horizontal arrangement produces an evaporative action which does not include a capillary drawing effect beyond that of the necessary evaporative effect required on the bulb.

Having thus described my invention, I claim:

1. The method of making an instrument of the class described comprising forming a U-tube having opposed aligned bulbs with each bulb communicating with one leg of the U-tube, providing a connecting tube connecting the bulbs, placing an indicating fluid in a portion of the U-tube below the connecting tube, passing gas through the bulbs and connecting tube to produce an aspirator effect on the air in the legs of the U-tube, sealing the ends of the bulbs allowing the liquid columns in the U-tube to balance and thereafter closing the connecting tube to thereby close communication between the bulbs.

2. The method of making an instrument of the class described comprising forming a capillary U-tube having opposed aligned bulbs, each communicating with one leg of the U-tube, providing a connecting tube connecting the bulbs, placing an indicating fluid in the U-tube, passing gas through the bulbs and connecting tube to produce an aspirator effect on the air in the legs of the U-tube, sealing the ends of the bulbs, allowing the liquid columns in the U-tube to balance and thereafter closing communication between the bulbs.

GEORGE E. BARNHART.